(12) United States Patent
Cheraga et al.

(10) Patent No.: US 12,344,376 B2
(45) Date of Patent: Jul. 1, 2025

(54) NACELLE AIR INTAKE FOR AN AIRCRAFT PROPULSION ASSEMBLY TO PROMOTE A THRUST REVERSAL PHASE

(71) Applicant: SAFRAN AIRCRAFT ENGINES, Paris (FR)

(72) Inventors: Yacine Cheraga, Moissy-Cramayel (FR); Daniel-Ciprian Mincu, Moissy-Cramayel (FR); Philippe Gérard Chanez, Moissy-Cramayel (FR); Jean-Loïc Hervé Lecordix, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 251 days.

(21) Appl. No.: 18/250,914

(22) PCT Filed: Oct. 28, 2021

(86) PCT No.: PCT/EP2021/079953
§ 371 (c)(1),
(2) Date: Apr. 27, 2023

(87) PCT Pub. No.: WO2022/096359
PCT Pub. Date: May 12, 2022

(65) Prior Publication Data
US 2024/0002036 A1    Jan. 4, 2024

(30) Foreign Application Priority Data

Nov. 9, 2020   (FR) ........................................ 2011473

(51) Int. Cl.
*B64C 7/02*      (2006.01)
*B64D 29/00*    (2006.01)
(Continued)

(52) U.S. Cl.
CPC ................ *B64C 7/02* (2013.01); *B64D 29/00* (2013.01); *B64D 33/02* (2013.01); *F02C 7/04* (2013.01);
(Continued)

(58) Field of Classification Search
CPC ............ B64D 33/02; B64D 2033/0226; B64D 2033/0286; B64D 29/00; B64C 7/02; F02C 7/04; F02C 7/042
See application file for complete search history.

(56) References Cited

U.S. PATENT DOCUMENTS 4,799,633 A  *  1/1989  Lahti ...................... B64D 29/00
                                                                244/35 R
10,399,687 B2    9/2019  Kawai et al.
(Continued)

FOREIGN PATENT DOCUMENTS

CA        1209354 A         8/1986
CN      113357005 A  *      9/2021
(Continued)

OTHER PUBLICATIONS

English machine translation of WO-2020/183109-A1, Mar. 10, 2025.*
(Continued)

*Primary Examiner* — Christopher Verdier
(74) *Attorney, Agent, or Firm* — RANKIN, HILL & CLARK LLP

(57) ABSTRACT

An air intake for an aircraft propulsion assembly extending along a longitudinal axis and including a turbine engine that includes a primary flow path and a secondary flow path for respectively guiding a primary air flow and a secondary air flow during a thrust, and thrust reversal for changing the secondary airflow into a reverse airflow during a thrust reversal. The air intake including a peripheral external (Continued)

enclosure including, in each plane radial to the axis, a point of maximum curvature for detaching the reverse airflow, an osculating circle defining a radius of curvature that is defined at each of the points of maximum curvature. The average value of the radii of curvature being less than a product of 0.028 times an internal radius of the air intake at the fan.

16 Claims, 5 Drawing Sheets

(51) Int. Cl.
    *B64D 33/02*     (2006.01)
    *F02C 7/04*     (2006.01)
    *F02C 7/042*     (2006.01)
(52) U.S. Cl.
    CPC ...... *F02C 7/042* (2013.01); *B64D 2033/0226* (2013.01); *B64D 2033/0286* (2013.01)

(56) References Cited

U.S. PATENT DOCUMENTS

| | | |
|---|---|---|
| 2022/0186663 A1 | 6/2022 | Mincu et al. |
| 2024/0125285 A1* | 4/2024 | Cheraga .................. F02K 1/66 |

FOREIGN PATENT DOCUMENTS

| | | |
|---|---|---|
| FR | 3095244 A1 | 10/2020 |
| WO | WO-2020/183109 A1 * | 9/2020 |

OTHER PUBLICATIONS

English machine translation of CN-113357005-A, Mar. 10, 2025.*
International Search Report from corresponding International Application No. PCT/EP2021/079953, dated Jan. 18, 2022, 2 pages.

* cited by examiner

NACELLE AIR INTAKE FOR AN AIRCRAFT PROPULSION ASSEMBLY TO PROMOTE A THRUST REVERSAL PHASE

TECHNICAL FIELD

The present invention relates to the field of aircraft propulsion assemblies and more particularly a nacelle air intake for an aircraft propulsion assembly.

In a known manner, in reference to FIG. 1A, an aircraft propulsion assembly 800 extends along a longitudinal axis X oriented from upstream to downstream and comprises a turbine engine 700 and a nacelle 200. The turbine engine 700 extends along the longitudinal axis X and is configured to allow propulsion of the aircraft from the acceleration of an inner airflow F-INT circulating from upstream to downstream in the turbine engine 700. The nacelle 200, on the other hand, extends outwardly around the turbine engine 700 along the longitudinal axis X and makes it possible to guide the inner airflow F-INT in the turbine engine 700. Subsequently, the terms "upstream" and "downstream" are defined with respect to the orientation of the longitudinal axis X. The terms "inner" and "outer" in turn are defined along the radial direction with respect to the longitudinal axis X.

In a known manner, as shown in FIG. 1A, the turbine engine 700 is a bypass turbine engine and comprises upstream a fan 300 rotatably mounted about the longitudinal axis X to accelerate the inner airflow F-INT from upstream to downstream. The turbine engine 700 also comprises, downstream of the fan 300, a primary flow path 400, radially inner, and a secondary flow path 500, radially outer, which are separated by a casing 600. The casing 600 is configured to direct a first portion of the inner airflow F-INT, called primary air flow F1, into the primary flow path 400 for fuel combustion and a second portion of the inner airflow F-INT, called secondary air flow F2, into the secondary flow path 500 in order to generate the thrust of the turbine engine 700.

In a known manner, still in reference to FIG. 1A, the nacelle 200 extends radially outwards to the fan 300 and radially outwardly delimits the secondary flow path 500. The nacelle 200 comprises at its upstream end an air intake 100 comprising a peripheral external enclosure 110 delimiting an annular inner cavity 120. The peripheral external enclosure 110 comprises an inner wall 130 turned towards the longitudinal axis X and an outer wall 140 opposite the inner wall 130, connected together upstream by an air intake lip 150 comprising a leading edge. The air intake 100 has an aerodynamic rounded profile that makes it possible to separate an upstream air flow F into the inner airflow F-INT guided by the inner wall 130 and an outer airflow F-EXT guided by the outer wall 140.

In reference to FIG. 1B, to reduce the braking distance of an aircraft, especially during landing, it is known to modify the orientation of the air flow in the secondary flow path 500 in order to perform a thrust reversal phase B. In what follows, a thrust phase A (FIG. 1A) is distinguished wherein the secondary air flow F2 circulates from upstream to downstream in the secondary flow path 500 and a thrust reversal phase B (FIG. 1B) wherein a reverse airflow F-INV circulates from downstream to upstream. It is specified that during a thrust reversal phase B, an inner airflow F-INT from the upstream air flow F circulates from upstream to downstream at the root of the fan 300 to supply the primary air flow F1 as well as in thrust phase A. The primary air flow F1 may also be supplied by a portion of the reverse airflow F-INV which bypasses the casing 600.

To carry out the thrust reversal phase, it is known by patent application FR2120172A1 to at least partially obstruct the secondary flow path 500, downstream of the fan 300, and to jointly uncover the grids housed in the nacelle 200 in order to form the reverse airflow F-INV oriented inversely to the secondary air flow F2. However, such a thrust reversal system has the disadvantage of penalizing the mass, size and drag of the aircraft propulsion assembly 800, in particular for a large-diameter nacelle 200 used in high dilution rate aircraft propulsion assemblies, namely of which the ratio of the mass of the secondary air flow F2 to the mass of the primary air flow F1 is greater than 16, and in particular greater than 20.

In reference to FIG. 1B, for high dilution rate aircraft propulsion assemblies, it is known to provide a variable-pitch fan 300, known by its abbreviation "VPF", which comprises blades the pitch angle of which is controlled so as to reverse the direction of circulation of the air flow in the secondary flow path 500. In practice, during a thrust reversal phase B, the reverse airflow F-INV circulates from downstream to upstream in the secondary flow path 500 and then passes through the fan 300 and is guided upstream by the upstream inner wall 110 of the air intake 100. The reverse airflow F-INV then opposes the upstream air flow F, particularly radially outwards in the vicinity of the nacelle 200, which allows braking. The reverse airflow F-INV then joins the outer airflow F-EXT which is admitted through the downstream end of the nacelle 200 into the secondary flow path 500.

In fact, it is observed that the reverse airflow F-INV remains attached to the peripheral external enclosure 110 of the air intake 100 when it joins the outer airflow F-EXT, i.e. it follows the contour of the air intake 200 without detaching from the peripheral external enclosure 110, such a phenomenon being known as the "Coanda effect". Such a phenomenon tends to accelerate the reverse airflow F-INV at the air intake 100, which generates a local depression causing a force opposing the thrust reversal phase. Such a phenomenon may reduce the performance of the turbine engine 700 in thrust reversal phase, which is undesirable.

To increase the performance of the turbine engine 700 during a thrust reversal phase, it is known through patent applications FR1904087A1 and FR1904094A1 to mount in a mobile manner deflection devices and rectifier blades respectively on the air intake 100, which are deployed during a thrust reversal phase B and retracted during a thrust phase A. Patent applications FR1904089A1 and FR1904096A1 alternately teach to make a portion of the air intake 100 mobile or elastically deformable during the thrust reversal phase B. Patent application FR1904092A1 in turn teaches to form inner ducts in the air intake 100 that are opened during the thrust reversal phase B to divert a portion of the reverse airflow F-INV. All these solutions advantageously make it possible to modify the rounded profile of the air intake only during a thrust reversal phase B to prevent the formation of a local depression, without reducing performance in the thrust phase A. However, such solutions have the disadvantage of requiring a dual-profile architecture air intake that is complex, costly and that needs to be actuated, which makes it subject to possible failure.

Incidentally, to improve drag during a thrust phase, an air intake is known through application U.S. Ser. No. 10/399,687B2 comprising a through-hole opening, the opening of which is controlled by a mobile covering member. Such a solution has the same drawbacks as before.

The invention thus relates to a nacelle 200 air intake 100 of an aircraft propulsion assembly 800 making it possible to promote the performance of the turbine engine 700 both during a thrust phase A and a thrust reversal phase B and having a simple and robust architecture.

SUMMARY

The invention relates to a nacelle air intake for an aircraft propulsion assembly, said aircraft propulsion assembly extending along a longitudinal axis oriented from upstream to downstream and comprising a turbine engine comprising a radially inner primary flow path and a radially outer secondary flow path configured to guide respectively from upstream to downstream a primary air flow and a secondary air flow during a thrust phase, said turbine engine comprising upstream a fan mounted rotatably about the longitudinal axis, said aircraft propulsion assembly comprising thrust reversal means configured to modify the secondary air flow into a reverse airflow circulating from downstream to upstream in the secondary flow path during a thrust reversal phase, said nacelle extending outwardly around the turbine engine and comprising at its upstream end the air intake, said air intake comprising a peripheral external enclosure of a longitudinal axis comprising an inner wall turned towards the longitudinal axis and an outer wall opposite the inner wall which are connected upstream by an air intake lip comprising a leading edge to promote the thrust phase, said air intake comprising an inner radius at the fan known as "fan radius R3", said peripheral external enclosure comprising a variable curvature in a plane radial to the longitudinal axis.

The invention is remarkable in that the peripheral external enclosure of the air intake comprises, in each radial plane, a point of maximum curvature so as to detach the reverse airflow from the peripheral external enclosure in order to promote a thrust reversal phase, an osculating circle comprising a radius of curvature being defined at each of the points of maximum curvature, the average value Rmoy of the radii of curvature at the periphery of the air intake verifying the following relationship: Rmoy<0.028*R3.

By geometric definition, the osculating circle at a point on a curve corresponds to the circle tangent to the curve at the point and which follows the curve as closely as possible. Considering that the peripheral external enclosure describes a curve in each radial plane along the longitudinal axis, hereinafter referred to as the "air intake curve", the osculating circle at a point of maximum curvature of an air intake curve designates the circle tangent to said air intake curve at said point of maximum curvature and which best follows the air intake curve there. The radius of curvature designates the radius of the osculating circle, i.e. the straight segment connecting its center and its circumference.

The mathematical definition of the radius of curvature R at a point of maximum curvature P of an air intake curve defined by a parametric equation in Cartesian coordinates x(p), y(P) is also provided:

$$R(P) = \frac{\left(\frac{dx^2}{dP} + \frac{dy^2}{dP}\right)^{\frac{3}{2}}}{\frac{dx d^2 y}{dP dP^2} - \frac{dy d^2 x}{dP dP^2}}$$ [Math 1]

Thanks to the invention, the air intake comprises an unchanged profile that makes it possible to effectively guide the air flow both in the thrust phase and in the thrust reversal phase, which promotes the performance of the aircraft turbine engine. More precisely, the profile of the air intake comprises on the one hand a rounded upstream end and on the other hand a set of maximum curvature points. The rounded upstream end advantageously enables in the thrust phase to separate the upstream air flow into an inner airflow to supply the aircraft turbine engine and an outer air flow. The points of maximum curvature allow the reverse airflow to be detached from the peripheral external enclosure during the thrust reversal phase.

According to a first aspect of the invention, the peripheral external enclosure of the air intake is free of moving parts. According to another aspect, independent of the first aspect, the peripheral external enclosure is non-deformable. Such a stationary and non-deformable profile air intake advantageously has a simple, robust, durable and economical architecture.

According to one aspect of the invention, the average value of the radii of curvature verifies the following relationship: Rmoy<0.02*R3, and preferably the following relationship: Rmoy<0.01*R3. In other words, the air intake comprises at the points of maximum curvature a very pronounced curvature, i.e. a low radial thickness, which promotes the detaching of the reverse airflow.

According to a preferred aspect of the invention, the average value of the radii of curvature verifies the following relationship: Rmoy>0.005*R3. This guarantees a minimal radial thickness at the air intake, to maintain performance in thrust phase.

According to one aspect of the invention, the points of maximum curvature are located in an upstream portion of the peripheral external enclosure which comprises a longitudinal length L16 defined from the leading edge of the air intake lip and verifying the following relationship: L16<6*Rmoy, preferably: L16<4*Rmoy, and preferably: L16<2*Rmoy. In other words, the longitudinal length is defined between the upstream end of the air intake, namely the leading edge, and a variable downstream point depending on the average value of the radii of curvature. Thus, the points of maximum curvature are concentrated in the vicinity of the air intake lip. This advantageously makes it possible to initiate the detaching of the reverse airflow in the vicinity of the air intake lip in order to detach it from the outer wall, and this in order to prevent any local depression which is harmful to the thrust reversal.

According to one aspect, the points of maximum curvature are located on the leading edge of the air intake lip, optimum point for priming the detaching of the reverse airflow.

According to one aspect of the invention, the points of maximum curvature together form a closed curve, known as a "detaching curve", preferably belonging to a transverse plane in the longitudinal axis, preferably in the form of a circle of center crossed by the longitudinal axis. In other words, the points of maximum curvature extend continuously in relation to each other and all preferably belong to the same plane, for an overall and homogeneous detaching of the reverse airflow over the entire contour of the peripheral external enclosure. A circle-shaped detaching curve corresponds to an axisymmetric air intake and allows for perfectly homogeneous detaching.

Preferably, the value of the radius of curvature of the osculating circle, defined at two consecutive points of maximum curvature of the detaching curve, varies by no more than 10%, preferably by no more than 5%. In other words, the air intake lip comprises a radial thickness that gradually varies over its circumference, for homogeneous detaching of the reverse airflow. Thin and thick areas are not adjacent to each other.

According to one aspect of the invention, the value of the radius of curvature of the osculating circle, defined in at least 25% of the points of maximum curvature, is substantially identical, preferably for at least 50% of the points of maximum curvature, and preferably for all the points of maximum curvature. In other words, the air intake lip comprises a radial thickness that is substantially constant around its circumference, for homogeneous detaching of the reverse airflow. It is specified that the expression "substantially identical" or "substantially constant" used here and throughout the patent application authorizes a deviation of at most 10%.

The invention also relates to an assembly of an air intake and a turbine engine fan for an aircraft propulsion assembly rotatably mounted about the longitudinal axis, said air intake extending outwardly around the fan, said fan comprising a plurality of variable-pitch blades so as to form the thrust reversal means of the aircraft propulsion assembly. This makes it advantageous to promote the thrust reversal phase, in particular by avoiding the use of a grid system housed in the nacelle which adds mass and size.

Preferably, the fan comprises a compression ratio, defined as the ratio of the pressure at the fan outlet to that at the fan intake, which is less than 1.4 in order to optimize the operation of turbine engines with a high dilution rate.

Preferably, the air intake comprises a length L1, defined as the longitudinal distance separating the leading edge of the air intake lip and the upstream edge of the fan blades, which verifies the following relationship: $L1<0.8*R3$, and preferably the following relationship: $L1<0.6*R3$, and preferably the following relationship: $L1<0.4*R3$. The detaching of the reverse airflow from the peripheral external enclosure is advantageously easier for a short air intake.

The invention also relates to a nacelle for an aircraft propulsion assembly, said aircraft propulsion assembly extending along a longitudinal axis oriented from upstream to downstream and comprising a turbine engine comprising a radially inner primary flow path and a radially outer secondary flow path configured to guide respectively a primary air flow and a secondary air flow during a thrust phase from upstream to downstream, said turbine engine comprising upstream a fan rotatably mounted about the longitudinal axis, said aircraft propulsion assembly comprising thrust reversal means configured to modify the secondary air flow into a reverse airflow circulating from downstream to upstream in the secondary flow path during a thrust reversal phase, said nacelle extending outwardly around the turbine engine and comprising at its upstream end an air intake as described previously.

Preferably, the nacelle comprises a maximum outer radius Rmax, defined as the maximum radial distance separating its center to its outer wall, which verifies the following relationship: $Rmax<1.2*R3$, and preferably the following relationship: $Rmax<1.15*R3$, and preferably the following relationship: $Rmax<1.1*R3$. In other words, such a nacelle comprises a low radial thickness, which makes it possible to favor the detaching of the reverse airflow from the peripheral external enclosure.

Preferably, the nacelle comprises a length L2, defined as the length of the peripheral external enclosure of the nacelle, which verifies the following relationship: $L2<3*R3$, and preferably the following relationship: $L2<2.5*R3$, and preferably the following relationship: $L2<2*R3$. A nacelle of short length may advantageously be provided with a short air intake and comprise a low radial thickness.

The invention further relates to an aircraft propulsion assembly extending along a longitudinal axis oriented from upstream to downstream and comprising a turbine engine and a nacelle, said turbine engine comprising a radially inner primary flow path and a radially outer secondary flow path configured to guide respectively a primary air flow and a secondary air flow during a thrust phase from upstream to downstream, said turbine engine comprising upstream a fan rotatably mounted about the longitudinal axis, said aircraft propulsion assembly comprising thrust reversal means configured to modify the secondary air flow into a reverse airflow circulating from downstream to upstream in the secondary flow path during a thrust reversal phase, said nacelle extending outwardly around the turbine engine and comprising at its upstream end an air intake as described previously, the aircraft propulsion assembly preferably comprising a dilution ratio greater than 20. It is specified that the dilution ratio is defined as the ratio of the mass of the secondary air flow to the mass of the primary air flow. Such a propulsion assembly with a very high dilution rate advantageously increases the propulsion efficiency and thus increases the performance of the aircraft turbine engine in the thrust phase.

The invention further relates to a method of using a nacelle air intake for an aircraft propulsion assembly as described previously, wherein:
during a thrust phase, the air intake lip separates an upstream air flow circulating from upstream to downstream into an outer air flow guided by the outer wall and an inner airflow guided by the inner wall, and
during a thrust reversal phase, the points of maximum curvature detach from the peripheral external enclosure a reverse airflow circulating from downstream to upstream in the air intake to join the outside air flow, in order to promote the thrust reversal phase.

Such a method is advantageously free of any step of moving and/or deforming the air intake, the latter maintaining its shape during a thrust reversal phase, which gives it a simple, robust, durable and economical architecture. The method is also quick and easy to implement, with no latency to switch from one phase to the other.

The invention further relates to a method of using an aircraft propulsion assembly such as described previously, wherein:
during a thrust phase, the air intake lip separates an upstream air flow circulating from upstream to downstream into an outer air flow guided by the outer wall and an inner airflow guided by the inner wall, and
during a thrust reversal phase, the thrust reversal means are activated and the points of maximum curvature detach from the peripheral external enclosure a reverse airflow circulating from downstream to upstream in the air intake to join the outside air flow, in order to promote the thrust reversal phase.

Preferably, during a thrust reversal phase, the pitch of the fan blades is modified to form the reverse airflow.

BRIEF DESCRIPTION OF THE DRAWINGS

The invention will be better understood upon reading the following description, given as an example, and by referring to the following figures, given as non-limiting examples, wherein identical references are given to similar objects.

It should be noted that the figures set out the invention in detail in order to implement the invention, said figures may of course be used to better define the invention if necessary.

DETAILED DESCRIPTION

Figure 1A:
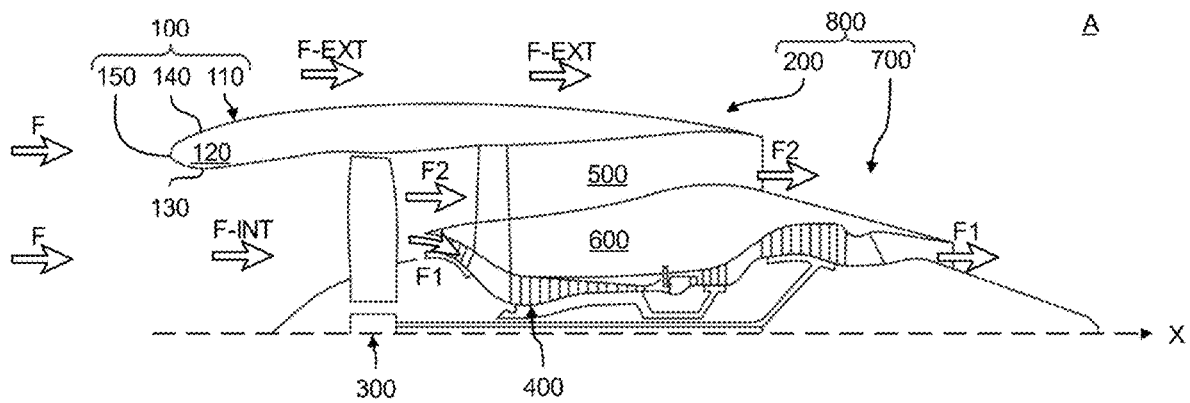
FIG. 1A is a longitudinal half-sectional representation of an aircraft propulsion assembly according to the prior art during a thrust phase.
Figure 1B:
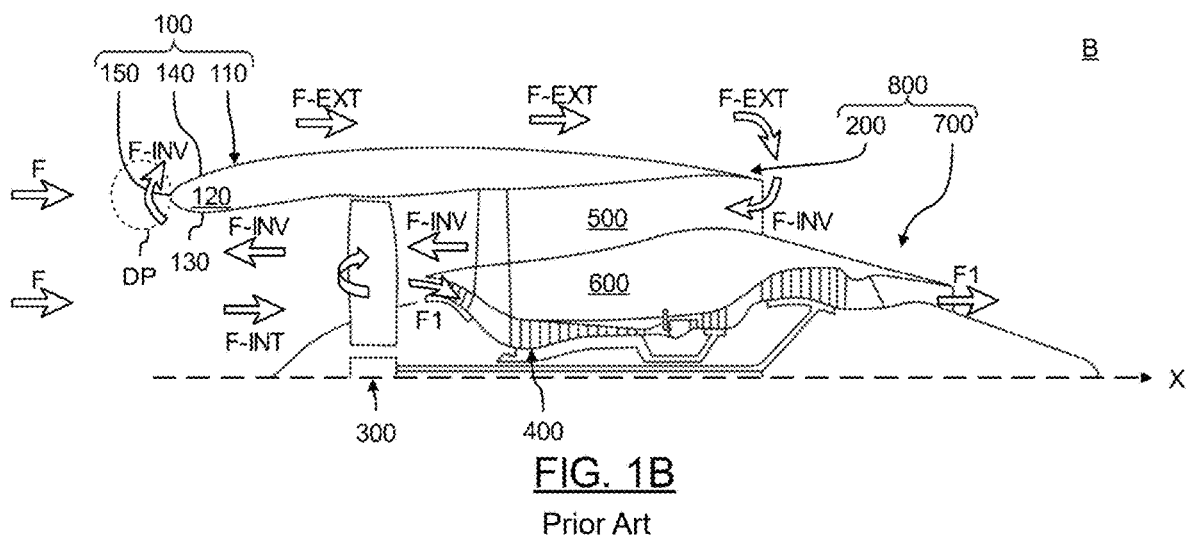
FIG. 1B is a longitudinal half-sectional representation of the aircraft propulsion assembly of FIG. 1A during a thrust reversal phase.
Figure 2A:
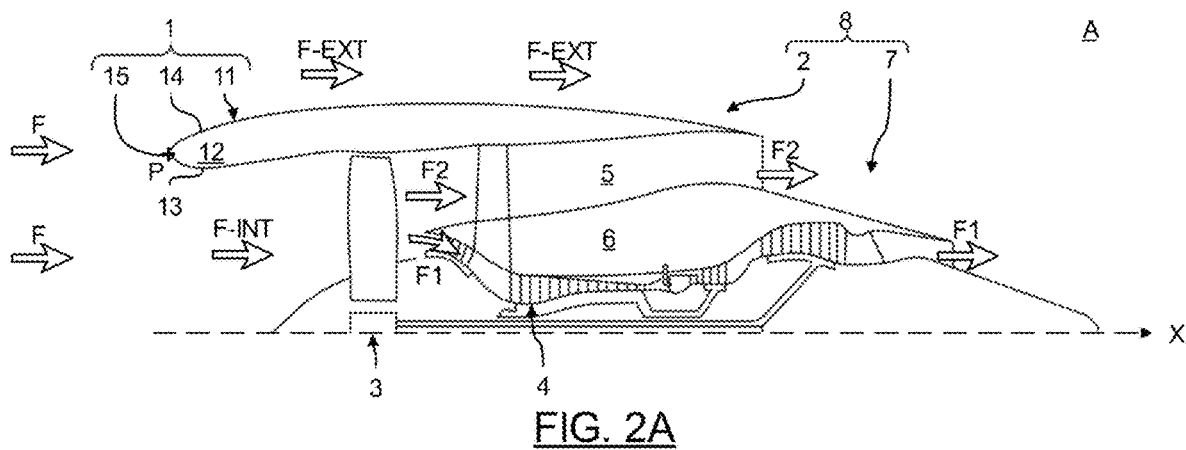
FIG. 2A is a longitudinal half-sectional representation of an aircraft propulsion assembly according to one embodiment of the invention during a thrust phase.
Figure 2B:
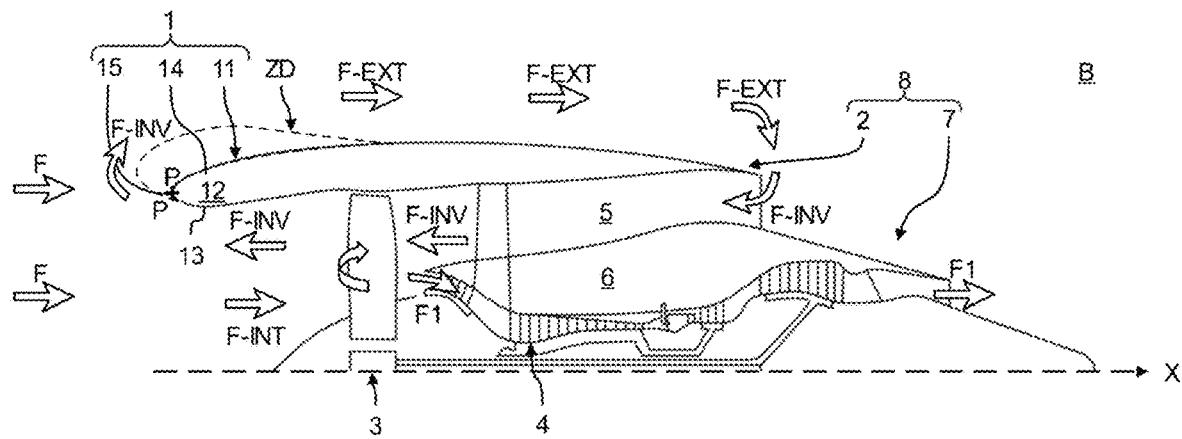
FIG. 2B is a longitudinal half-sectional representation of the aircraft propulsion assembly of FIG. 2A during a thrust reversal phase.

In reference to FIGS. 2A and 2B, the invention relates to an innovative aerodynamic profile aircraft propulsion assembly 8, in particular at air intake 1, to promote performance both during a thrust phase A and during a thrust reversal phase B.

As shown in FIG. 2A and described in the preamble, the aircraft propulsion assembly 8 extends along a longitudinal axis X oriented from upstream to downstream and comprises a turbine engine 7 and a nacelle 2. The turbine engine 7 extends along the longitudinal axis X and is configured to allow propulsion of the aircraft from the acceleration of an inner airflow F-INT circulating from upstream to downstream in the turbine engine 7. The nacelle 2 extends outwardly around the turbine engine 7 along the longitudinal axis X and makes it possible to guide the inner airflow F-INT in the turbine engine 7. Subsequently, the terms "upstream" and "downstream" are defined with respect to the orientation of the longitudinal axis X. The terms "inner" and "outer" in turn are defined along the radial direction with respect to the longitudinal axis X.

As shown in FIG. 2A and described in the preamble, the turbine engine 7 is of the bypass type and comprises upstream a fan 3 rotatably mounted about the longitudinal axis X to accelerate the inner airflow F-INT from upstream to downstream. The turbine engine 7 also comprises, downstream of the fan 3, a primary flow path 4, radially inner, and a secondary flow path 5, radially outer, which are separated by a casing 6. The casing 6 is configured to guide a first portion of the inner airflow F-INT, called primary air flow F1, into the primary flow path 4 for fuel combustion and a second portion of the inner airflow F-INT, called secondary air flow F2, into the secondary flow path 5 in order to generate the thrust of the turbine engine 7.

Still in reference to FIG. 2A and as described in the preamble, the nacelle 2 extends radially outwards to the fan 3 and radially outwardly delimits the secondary flow path 5. The nacelle 2 at its upstream end comprises an air intake 1 comprising a peripheral external enclosure 11 delimiting an annular inner cavity 12. The peripheral external enclosure 11 comprises an inner wall 13 turned towards the longitudinal axis X and an outer wall 14 opposite the inner wall 13, connected together upstream by an air intake lip 15 comprising a leading edge. The air intake 1 has an aerodynamic rounded profile that makes it possible to separate an upstream air flow F into the inner airflow F-INT guided by the inner wall 13 and an outer airflow F-EXT guided by the outer wall 14.

In reference to FIG. 2B and as described in the preamble, the fan 3 is of the variable pitch type, known under its abbreviation "VPF" (Variable Pitch Fan), i.e. it comprises blades the pitch angle of which is controlled so as to reverse the direction of circulation of the air flow in the secondary flow path 5. In what follows, a thrust phase A (FIG. 2A) is distinguished wherein the secondary air flow F2 circulates from upstream to downstream in the secondary flow path 5 and a thrust reversal phase B (FIG. 2B) wherein a reverse airflow F-INV circulates from downstream to upstream to reduce the braking distance of an aircraft, in particular during landing. In practice, during a thrust reversal phase B, the reverse airflow F-INV circulates from downstream to upstream in the secondary flow path 5 and then passes through the fan 3 and is guided upstream by the upstream inner wall 11 of the air intake 1. The reverse airflow F-INV then opposes the upstream air flow F, particularly radially outwardly in the vicinity of the nacelle 2, which allows braking. The reverse airflow F-INV then joins the outer airflow F-EXT which is admitted through the downstream end of the nacelle 2 into the secondary flow path 5. It is specified that during a thrust reversal phase B, an inner airflow of F-INT from the upstream air flow F flows from upstream to downstream at the root of the fan 3 to supply the primary air flow F1 as well as in thrust phase A. The primary air flow F1 may also be supplied by a portion of the reverse airflow F-INV which bypasses the casing 6.

Other thrust reverse systems could be used as an alternative to variable-pitch fan 3. In particular, it could be provided to at least partially obstruct the secondary flow path 5 downstream of the fan 3, and to jointly uncover grids housed in the nacelle 2 in order to form the reverse airflow F-INV. In particular, a grid or flap reverser could be used.

To promote the performance of the aircraft propulsion assembly 8 both in the thrust phase A and the thrust reversal phase B, according to the invention and in reference to FIGS. 2A and 2B, the peripheral external enclosure 11 of the air intake 1 comprises an adapted curvature:

during a thrust phase A (FIG. 2A), to separate the upstream air flow F into the inner airflow F-INT and the outer airflow F-EXT, and during a thrust reversal phase B (FIG. 2B), to detach the reverse airflow F-INV from the peripheral external enclosure 11 when it joins the outer airflow F-EXT.

In other words, during a thrust reversal phase B, the peripheral external enclosure 11 is configured to generate a detaching zone ZD (FIG. 2B) at the outer wall 14 where the reverse airflow F-INV, instead of flowing from upstream to downstream along the contour of the outer wall 14, comprises a zero or even opposite speed and forms vortexes. The reverse airflow F-INV normally flows beyond the detaching zone ZD to join the outer airflow F-EXT. Such an air intake 1 advantageously makes it possible to prevent the appearance of the Coanda effect, characterized by local acceleration of the reverse airflow F-INV which remains attached to the outer wall 14, which generates a local depression which causes an undesirable force opposite the thrust reversal B. The air intake 1 is more preferably free of moving parts and non-deformable, which makes it durable and economical compared to an air intake comprising moving parts or a deformable enclosure.

Figure 3:
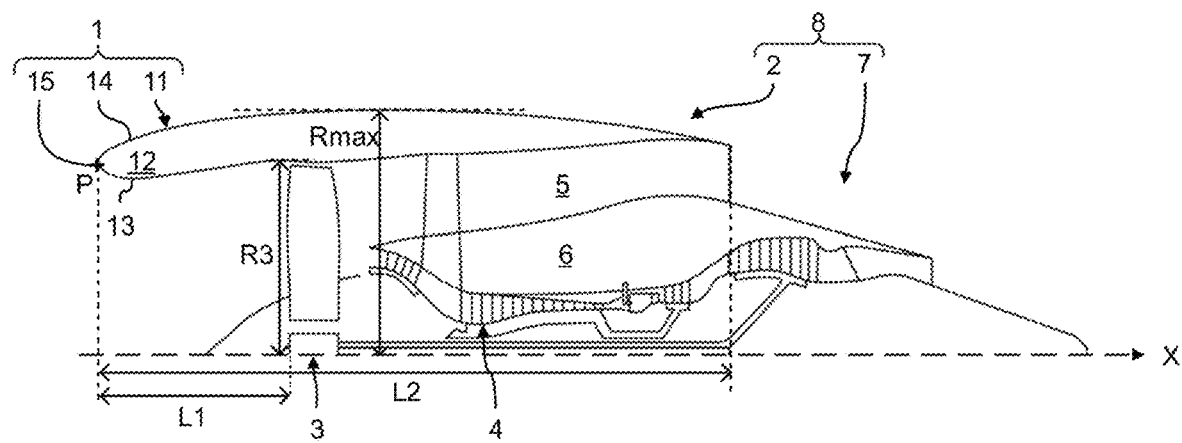
FIG. 3 is a longitudinal half-sectional representation of the aircraft propulsion assembly of FIG. 2A.

In reference to FIG. 3, in addition to the curvature of the peripheral external enclosure 11 of the air intake 1, the invention also has other geometric criteria to be met for the aircraft propulsion assembly 8 in order to promote its performance in both phases A, B. The first criterion is based on the dilution rate of the turbine engine 7 which is preferably greater than 16, preferably greater than 20. In reference to FIG. 2A, it is specified that the dilution ratio corresponds to the ratio of the mass of the secondary flow F2 to the mass of the primary flow F1 and is generally between 3 and 12 for bypass turbine engines 7. In other words, the turbine engine 7 has a very high dilution rate and generates most of its thrust, thanks to the acceleration of the secondary air flow F2, in practice more than 80%. A high dilution ratio also makes it possible to generate a substantial reverse airflow F-INV. It is stated that such a turbine engine 7 with a very high dilution rate is preferably associated with a more efficient variable-pitch fan 3 and which does not penalize the mass and the dimensions of the aircraft.

In reference to FIG. 3, the second criterion relates to the compression ratio of the fan 3, which is preferably less than 1.4. It is specified that the compression ratio is defined as the ratio of the pressure at the fan outlet to that at the fan intake. The following independent criteria relate to the nacelle 2, including:
  the length L2 defined as the length of the peripheral external enclosure 11 of the nacelle 2 along the longitudinal axis X preferably verifies: L2<3*R3, where R3 here and for the future designates the inner radius of air intake 1 at fan 3, referred to as "fan radius". Further preferably, the length L2 verifies: L2<2.5*R3 and preferably: L2<2*R3.
  the length L1 of the air intake 1 defined between the leading edge of the air intake lip 15 and the leading edge of the fan 3 preferably verifies: L1<0.8*R3. Further preferably, length L1 verifies: L1<0.6*R3 and preferably: L1<0.4*R3.
  the maximum outer radius Rmax of the nacelle 2 preferably verifies: Rmax<1.2*R3. Further preferably, the maximum outer radius Rmax verifies: Rmax<1.15*R3 and preferably: Rmax<1.1*R3.

In other words, these criteria impose a nacelle 2 and an air intake 1 of thin radial thickness, which promotes the detaching of the reverse airflow F-INV during a thrust reversal phase B. All the criteria exposed are preferably respected for optimum performance.

The curvature of the peripheral external enclosure 11 of air intake 1 is qualified more precisely in what follows.

According to the invention, in reference to FIGS. 2A, 2B and 3, the peripheral external enclosure 11 describes, in each plane radial to the longitudinal axis X, a curve subsequently referred to as the "air intake curve" which comprises a variable curvature and in particular a point of maximum curvature P, i.e. a point where the curvature is the most pronounced. Still according to the invention, each point of maximum curvature P is characterized by a radius of curvature, the average value Rmoy of which for all the points of maximum curvature P verifies: Rmoy<0.028*R3, where R3 is the fan radius. It is specified that the radius of curvature of a point on a curve corresponds to the radius of the osculating circle at said point on the curve, namely the radius of the circle tangent to the curve at said point which follows the curve as best as possible.

Figure 4:
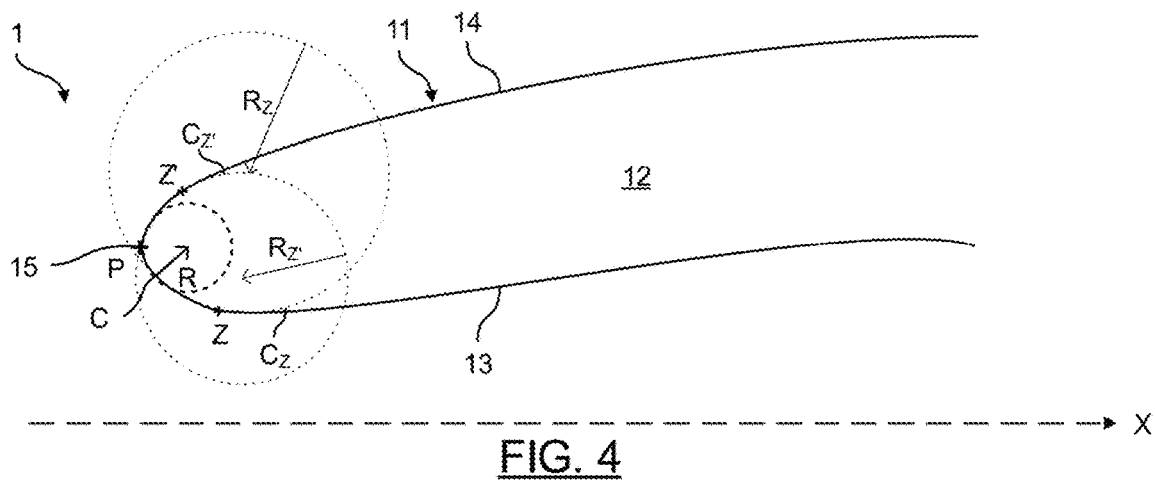
FIG. 4 is a radial half-sectional representation of the air intake of the propulsion assembly of FIG. 2A.

In the example of FIG. 4 showing the air intake 1 in radial half-cut, a point of maximum curvature P of an air intake curve is shown, as well as its osculating circle C of radius of curvature R. Two other points Z, Z' of the air intake curve as well as their osculating circle $C_Z$, $C_{Z'}$ of radii of curvature $R_Z$, $R_{Z'}$ are also shown. As shown in FIG. 4, the point of maximum curvature P corresponds to the point of the air intake curve comprising the smallest radius of curvature R, in particular less than the radii of curvature $R_Z$, $R_{Z'}$ of the points Z.

Such points of maximum curvature P advantageously form detaching points of the reverse airflow F-INV guided from downstream to upstream by the inner wall 13, due to their small radius of curvature which tends to detach the reverse airflow F-INV from the peripheral external enclosure 11. Thus, the air intake lip 15 and the points of maximum curvature P respectively make it possible to promote a thrust phase A and a thrust reversal phase B. Indeed, the air intake lip 15 promotes separation of the upstream air flow F into the inner airflow F-INT and the outer airflow F-EXT thanks to its rounded profile while the points of maximum curvature P promote detaching of the reverse airflow F-INV.

In the example of FIG. 4, the point of maximum curvature P is located at the upstream end of the air intake 1, confounded with the leading edge of the air intake lip 15. Advantageously, such a maximum curvature point P makes it possible to generate a detaching zone ZD (FIG. 2B) located at the upstream end of the air intake 1 and the outer wall 14, where the Coanda effect is likely to appear. However, it goes without saying that the point of maximum curvature P could be located elsewhere on the conical external enclosure 11, as will be seen later. In practice, regardless of the location of the point of maximum curvature P, the peripheral external enclosure 11 comprises a hybrid profile compatible with both a thrust phase A and a thrust reversal phase B. In practice, this results in an average radius of curvature Rmoy large enough for the thrust phase A, preferably verifying: Rmoy>0.005*R3 and small enough for thrust reversal phase B, preferably verifying: Rmoy<0.02*R3, and preferably: Rmoy<0.01*R3. Preferably, each radius of curvature R is greater than 0.005*R3, and preferably less than 0.05*R3. More preferably, each radius of curvature is less than 0.02*R3, preferably 0.01*R3.

Figure 5:
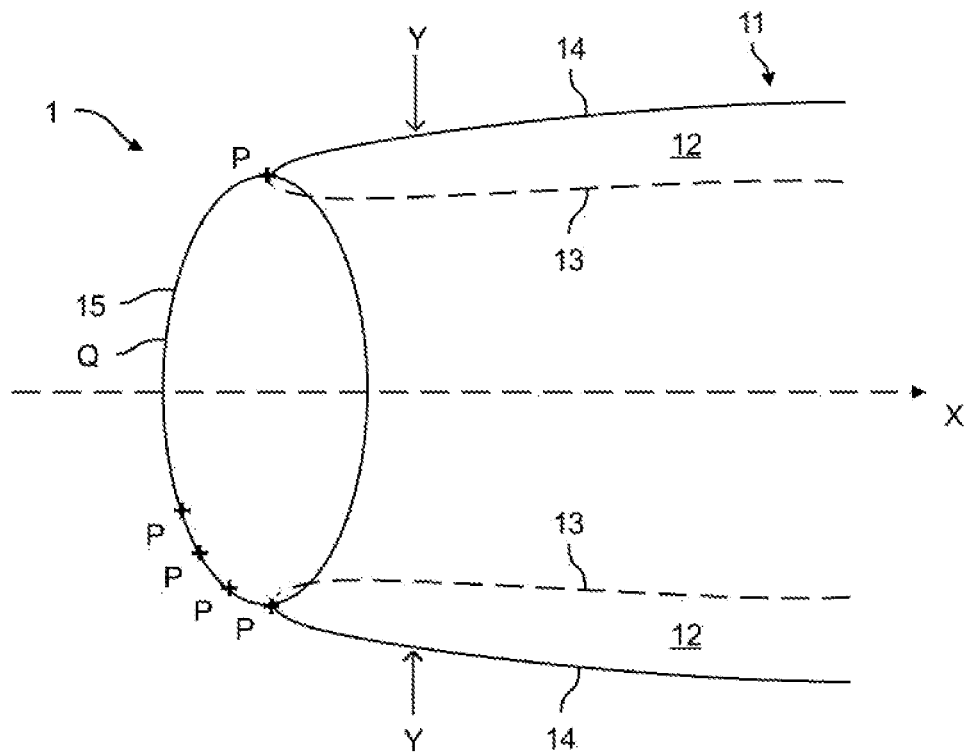
FIG. 5 is a perspective representation of the air intake of FIG. 4.

In reference to FIG. 5 showing the air intake 1 of FIG. 4 in perspective, all the points of maximum curvature P are located on the leading edge of the air intake lip 15 and together delimit a closed curve, called "detaching curve Q". In this example, as the air intake 1 is axisymmetric, the detaching curve Q is in the form of a circle of center crossed by the longitudinal axis X and extending in a plane transverse to the longitudinal axis X. Such a positioning of the points of maximum curvature P, namely extending continuously and all located in a same plane transverse to the longitudinal axis X, advantageously allows global and homogeneous detaching of the reverse airflow F-INV over the entire circumference of the air intake 1. It goes without saying that the points of maximum curvature P could be positioned differently from each other as will be seen later.

Figure 6:
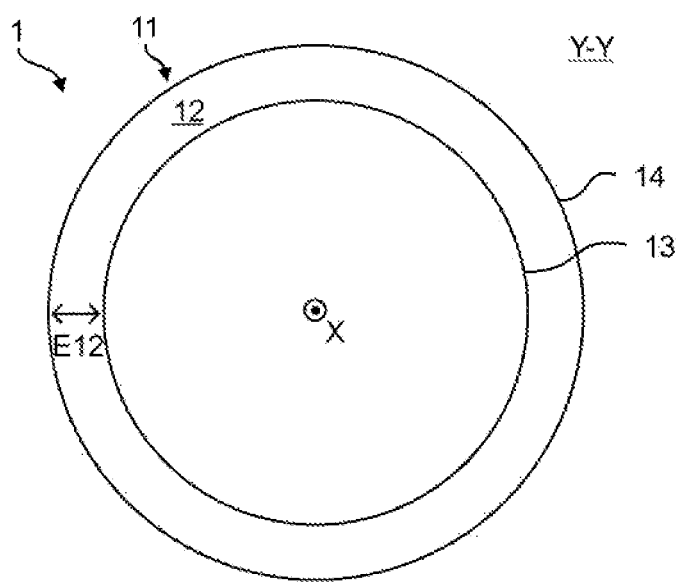
FIG. 6 is a cross-sectional representation of the air intake of FIG. 4.

In reference to FIG. 6 showing the air intake 1 of FIG. 4 in a plane Y-Y (FIG. 5) transverse to the longitudinal axis X, all the points of maximum curvature P comprise an identical radius of curvature R. In other words, the radius of curvature R of each point of maximum curvature P is equal to the average radius of curvature Rmoy. In practice, this results in an annular inner cavity 12 which, in the transverse plane Y-Y, comprises a constant radial thickness E12 over the entire circumference of the air intake 1. This advantageously allows homogeneous detaching over the entire circumference of the air intake 1. It goes without saying that the radius of curvature R could vary from one point of maximum curvature P to another, as will be seen later.

Figure 7:
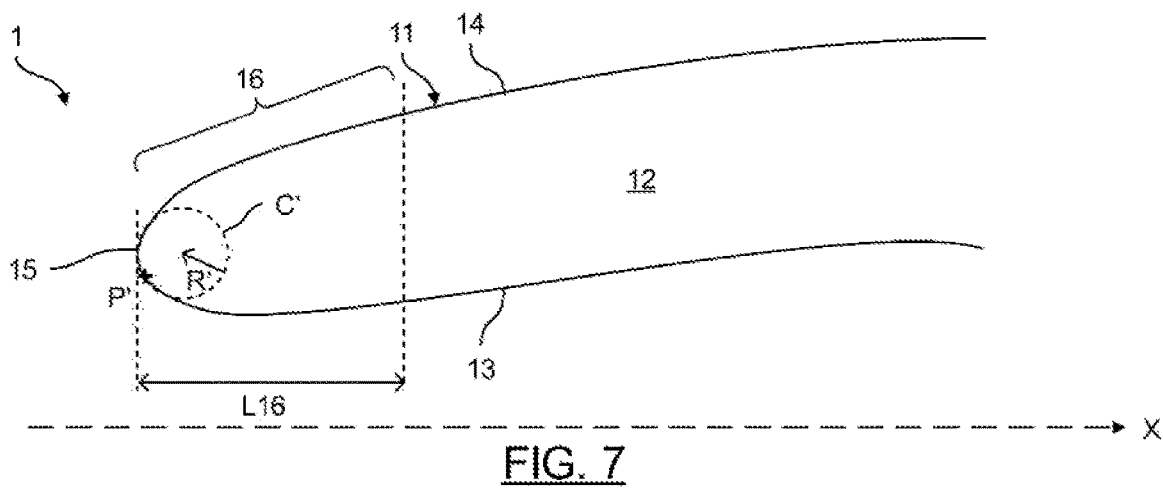
FIG. 7 is a radial half-sectional representation of an air intake of an aircraft propulsion assembly according to an alternative embodiment of the invention.

FIG. 7 shows an alternative embodiment of the invention with a point of maximum curvature P' separate from the leading edge of the air intake lip 15, namely in this example located on the inner wall 13 close to the air intake lip 15. A point of maximum curvature P' located on the inner wall 13 allows the reverse airflow F-INV to be detached in advance before the air intake lip 15. Alternatively, the point of maximum curvature P' could also be located on the outer wall 14, for later detaching of the reverse airflow F-INV. In practice, for each air intake curve, the point of maximum curvature P' is preferably located in an upstream portion 16 of the peripheral external enclosure 11 extending over a longitudinal length L16 from the leading edge of the air intake lip 15 along the longitudinal axis X which verifies: L16<6*Rmoy. Preferably, the upstream portion 16 is reduced and verifies: L16<4*Rmoy, and preferably: L16<2*Rmoy. In other words, the maximum curvature points P' are preferably located in the vicinity of the air intake lip 15 to generate a detaching zone ZD in contact with the air intake lip 15 and prevent any appearance of the Coanda effect.

Figure 8:
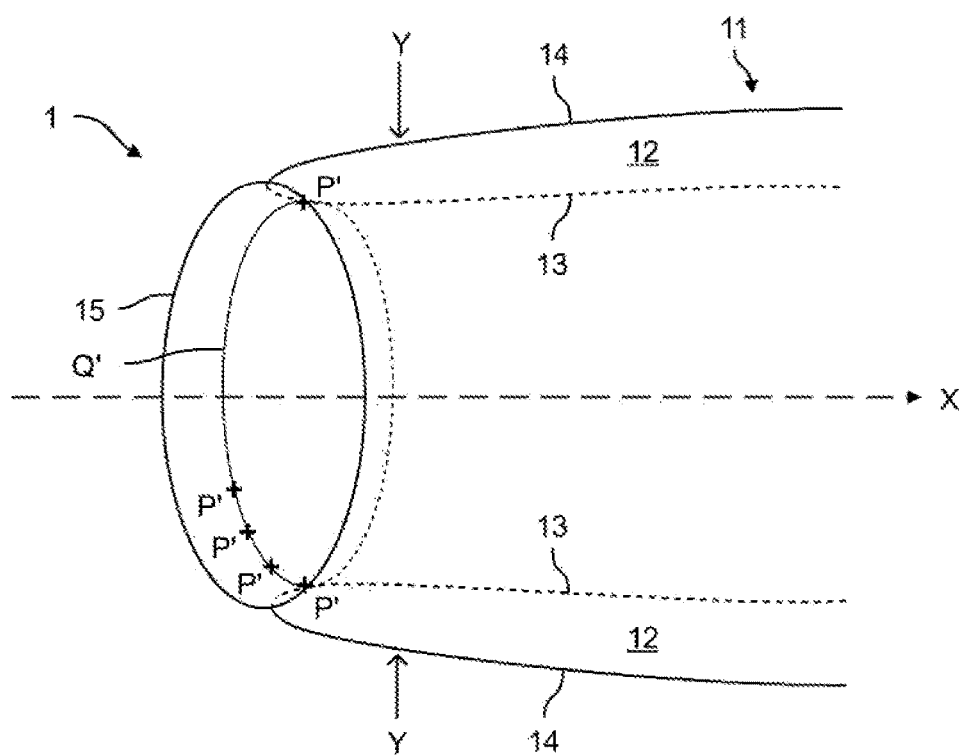
FIG. 8 is a perspective representation of the air intake of FIG. 7.

In the example in FIG. 8, all the points of maximum curvature P' are located as in the example in FIG. 7 on the inner wall 13 and belong to a same plane transverse to the longitudinal axis X. Such points of maximum curvature P' describe a detaching curve Q' extending in a plane transverse to the longitudinal axis X located downstream of the air intake lip 15, in this example in the shape of a circle with a diameter smaller than that of the air intake lip 15, and therefore of the detaching curve Q of FIG. 6. Such detaching curves Q. Q' allow homogeneous detaching of the reverse airflow over the entire circumference of the air intake 1.

Figure 9:
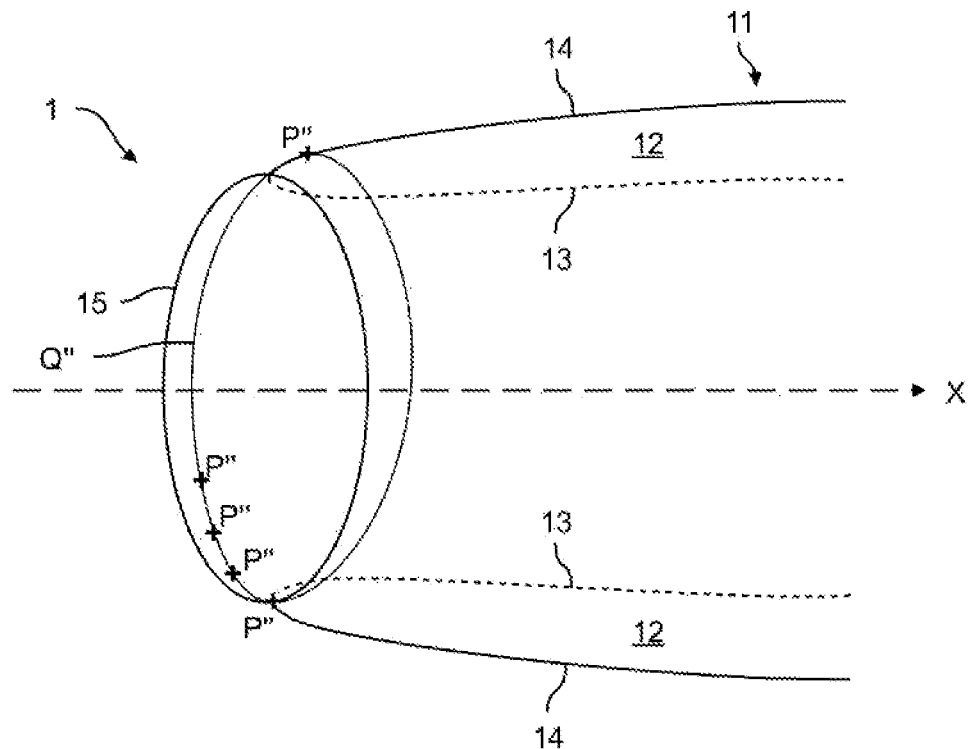
FIG. 9 is a perspective representation of an air intake of an aircraft propulsion assembly according to an alternative embodiment of the invention.

In reference to FIG. 9, for a non-axisymmetric air intake 1 or to promote the thrust phase A as examples, points of maximum curvature P''' positioned differently from each other on their air intake curve may be provided. In this example, certain points of maximum curvature P''' are thus located on the air intake lip 15 while others extend onto the outer wall 14. Preferably, the points of maximum curvature P''' extend continuously relative to each other so as to form a detaching curve Q'' extending in a plane that is not transverse to the longitudinal axis X.

Figure 10:
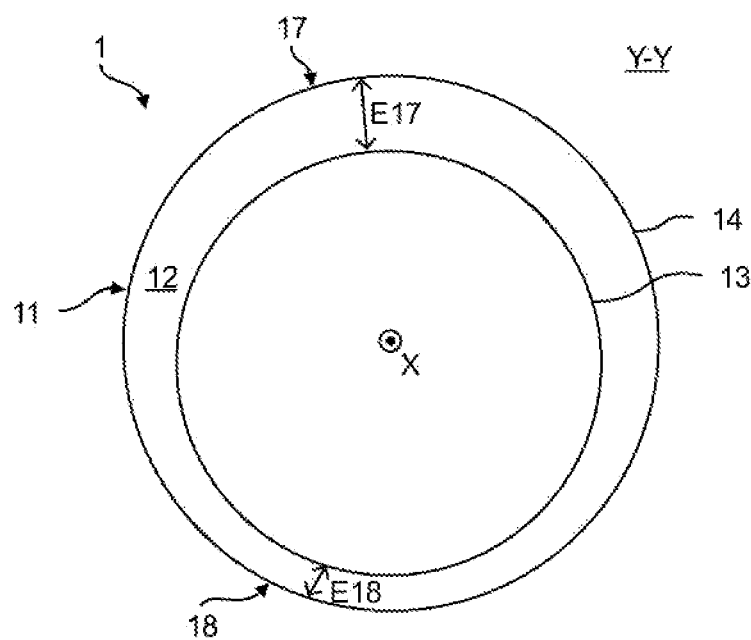
FIG. 10 is a cross-sectional representation of an air intake of an aircraft propulsion assembly according to another alternative embodiment of the invention.

In the embodiment shown in FIG. 10, the points of maximum curvature P, P', P''' of the peripheral external enclosure 11 of the air intake 1 comprise different radii of curvature R. R' so that the radial thickness of the annular cavity 12 varies in the transverse plane Y-Y (FIG. 5). In this example, the annular cavity 12 comprises a portion 17 of greater thickness E17 and a portion 18 of smaller thickness E18. A variation in the radial thickness of the annular cavity 12, advantageously makes it possible to promote the thrust phase A in thick areas and the thrust reversal phase B in thin areas. In practice, to preserve the aerodynamics of the air intake 1, the radial thickness of the annular cavity 12 and thus the radius of curvature R, R' of the points of maximum curvature P. P', P''' varies gradually and slightly. In the example of FIG. 10, the radial thickness of the annular cavity 12 gradually varies from the portion 17 of larger thickness E17 to the portion 18 of smaller thickness E18. Preferably, the radius of curvature R, R' varies by no more than 10%, preferably by no more than 5%, from a point of maximum curvature P, P', P''' to its neighbor. More preferably, the radius of curvature R. R' of at least 25% of the points of maximum curvature P, P', P''' is substantially identical, preferably at least 50% of the points of maximum curvature P, P', P''', and preferably all the points of maximum curvature P, P', P'''.

To summarize, the aircraft propulsion assembly 8 of the invention comprises an air intake 1 comprising a robust and economic architecture, free of moving parts and non-deformable, which promotes both a thrust phase A and a thrust reversal phase B. More precisely, the peripheral external enclosure 11 comprises an air intake lip 15 to efficiently separate the upstream air flow F in thrust A, but also a set of maximum curvature points P, P', P''' promoting the detachment of the reverse airflow F-INV in the vicinity of the air intake lip 15 during a thrust reversal B. To promote the performance of the aircraft propulsion assembly 8, it also comprises a variable-pitch fan 3, a turbine engine 7 with a very high dilution rate and a nacelle 2 with reduced length and radial thickness.

A method of using the aircraft propulsion assembly 8 according to the invention during a thrust phase A and during a thrust reversal phase B is described in what follows.

In reference to FIG. 2A, during a thrust phase A, during take-off or cruising conditions by way of example, the blades of the variable-pitch fan 3 are oriented so as to allow the air flow to circulate from upstream to downstream. The air intake lip 15 separates the upstream air flow F into an outer airflow F-EXT guided by the outer wall 14 and an inner airflow F-INT guided by the inner wall 13 to the turbine engine 7 to ensure its thrust.

In reference to FIG. 2B, during a thrust reversal phase B, during braking or landing by way of example, the pitch of the blades of the fan 3 is modified to reverse the direction of the secondary air flow F2 in the secondary flow path 5. A reverse airflow F-INV thus circulates from downstream to upstream, passes through the fan 3, and is guided by the inner wall 13 until it detaches therefrom at the points of maximum curvature P, P', P'''. A detaching zone ZD is then formed in contact with the air intake lip 15, which prevents any local depression harmful to the thrust reversal B.

Switching from a thrust phase A to a thrust reversal phase B is advantageously simple and quick to implement, requiring only a modification to the orientation of the fan blades 3. As in the prior art, no step of moving or deforming the air intake 1 is necessary. The profile of air intake 1 remains unchanged between the thrust phase A and thrust reversal phase B.

The invention claimed is:

1. An assembly of a nacelle, air intake, and of a fan of a turbine engine of an aircraft propulsion assembly, said aircraft propulsion assembly extending along a longitudinal axis oriented from upstream to downstream and comprising the turbine engine defining a radially inner primary flow path and a radially outer secondary flow path configured to guide from upstream to downstream, respectively, a primary air flow and a secondary air flow during a thrust phase, said turbine engine comprising the fan rotatably mounted about the longitudinal axis, said aircraft propulsion assembly comprising thrust reversal means configured to modify the secondary air flow into a reverse airflow circulating from downstream to upstream in the secondary flow path during a thrust reversal phase, said fan comprising a plurality of variable-pitch blades so as to form the thrust reversal means of the aircraft propulsion assembly, said nacelle extending outwardly around the turbine engine and comprising at its upstream end the air intake, said air intake extending outwardly around the fan, said air intake comprising a peripheral external enclosure of the longitudinal axis comprising an inner wall turned towards the longitudinal axis and an outer wall opposite the inner wall which are connected upstream by an air intake lip comprising a leading edge to promote the thrust phase, said air intake comprising an inner radius at the fan, said peripheral external enclosure comprising a variable curvature in a plane radial to the longitudinal axis, wherein:

a profile of the air intake is stationary and non-deformable, so that the profile remains unchanged between the thrust phase and the thrust reversal phase, and the peripheral external enclosure comprises, in each radial plane, a point of maximum curvature so as to detach the reverse airflow from the peripheral external enclosure in order to promote the thrust reversal phase, an osculating circle comprising a radius of curvature being defined at each of the points of maximum curvature, an average value of the radii of curvature at the periphery of the air intake being less than a product of 0.028 times the inner radius of the air intake at the fan.

2. The assembly according to claim 1, wherein the average value of the radii of curvature is less than a product of 0.02 times the inner radius of the air intake at the fan.

3. The assembly according to claim 1, wherein the points of maximum curvature of the air intake are located in an upstream portion of the peripheral external enclosure which defines a longitudinal length extending from the leading edge of the air intake lip and being less than a product of 6 times the average value of the radii of curvature at the periphery of the air intake.

4. The assembly according to claim 1, wherein the points of maximum curvature are located on the leading edge of the air intake lip.

5. The assembly according to claim 1, wherein the points of maximum curvature of the air intake together form a closed curve.

6. The assembly according to claim 1, wherein a value of the radius of curvature of the osculating circle defined in at least 25% of the points of maximum curvature is substantially identical.

7. The aircraft propulsion assembly extending along the longitudinal axis oriented from upstream to downstream, said aircraft propulsion assembly comprising:

the turbine engine, and the nacelle, said turbine engine defining the radially inner primary flow path and the radially outer secondary flow path configured to guide from upstream to downstream, respectively, the primary air flow and the secondary air flow during the thrust phase, the assembly of the air intake and the fan according to claim 1, said turbine engine comprising the fan and rotatably mounted about the longitudinal axis, and the thrust reversal means formed by the fan and configured to modify the secondary air flow into the reverse airflow circulating from downstream to upstream in the secondary flow path during the thrust reversal phase, said nacelle extending outwardly around the turbine engine and comprising at its upstream end the air intake.

8. A method of using the assembly of the nacelle, the air intake, and the turbine engine fan of the aircraft propulsion assembly according to claim 1, wherein:

during the thrust phase, the air intake lip separates an upstream air flow circulating from upstream to downstream into an outer airflow guided by the outer wall and an inner airflow guided by the inner wall, and during the thrust reversal phase implemented by modifying the pitch of the fan blades, the points of maximum curvature detach from the peripheral external enclosure a reverse airflow circulating from upstream in the air intake to join the outer airflow, in order to promote the thrust reversal phase.

9. The assembly according to claim 2, wherein the average value of the radii of curvature is less than a product of 0.01 times the inner radius of the air intake at the fan.

10. The assembly according to claim 3, wherein the points of maximum curvature of the air intake are located in the upstream portion of the peripheral external enclosure which defines the longitudinal length defined from the leading edge of the air intake lip and is less than a product of 4 times the average value of the radii of curvature at the periphery of the air intake.

11. The assembly according to claim 10, wherein the points of maximum curvature of the air intake are located in the upstream portion of the peripheral external enclosure which defines the longitudinal length extending from the leading edge of the air intake lip and is less than a product of 2 times the average value of the radii of curvature at the periphery of the air intake.

12. The assembly according to claim 5, wherein the closed curve formed together by the points of maximum curvature of the air intake belongs to a plane transverse to the longitudinal axis.

13. The assembly according to claim 12, wherein the closed curve formed together by the points of maximum curvature of the air intake is in a form of a circle of center crossed by the longitudinal axis.

14. The assembly according to claim 6, wherein the value of the radius of curvature of the osculating circle defined in at least 50% of the points of maximum curvature is substantially identical.

15. The assembly according to claim 14, wherein the value of the radius of curvature of the osculating circle defined in all the points of maximum curvature is substantially identical.

16. The aircraft propulsion assembly according to claim 7, wherein the aircraft propulsion assembly defines a dilution rate greater than 20.

* * * * *